Oct. 16, 1951     J. H. SCHWARTZ     2,571,624
TIRE TOOL

Filed April 10, 1947     2 SHEETS—SHEET 1

Inventor
James Henry Schwartz

By Clarence A. O'Brien
and Harvey B. Jacobson
Attorneys

Oct. 16, 1951   J. H. SCHWARTZ   2,571,624
TIRE TOOL

Filed April 10, 1947   2 SHEETS—SHEET 2

Inventor
James Henry Schwartz

By *Clarence A. O'Brien and Harvey B. Jacobson*
Attorneys

Patented Oct. 16, 1951

2,571,624

UNITED STATES PATENT OFFICE 2,571,624

TIRE TOOL

James Henry Schwartz, Siletz, Oreg.

Application April 10, 1947, Serial No. 740,579

6 Claims. (Cl. 254—50.1)

This invention relates to new and useful improvements in tire tools and the primary feature of the present invention is to provide a tool adapted to spread the beading of a tire casing facilitating entrance into said tire casing for the insertion of tubes, flaps, retainers and boots and for the inspection of tubes and the inside of tires.

Another feature of the present invention is to provide a tire tool which is particularly adapted for use with heavy duty tires, such as truck tires.

Another important feature of the present invention is to provide a tire tool of the character referred to which is quickly and readily disassembled facilitating transporting and storing of the same.

A further feature of the present invention is to provide a tire tool that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4:
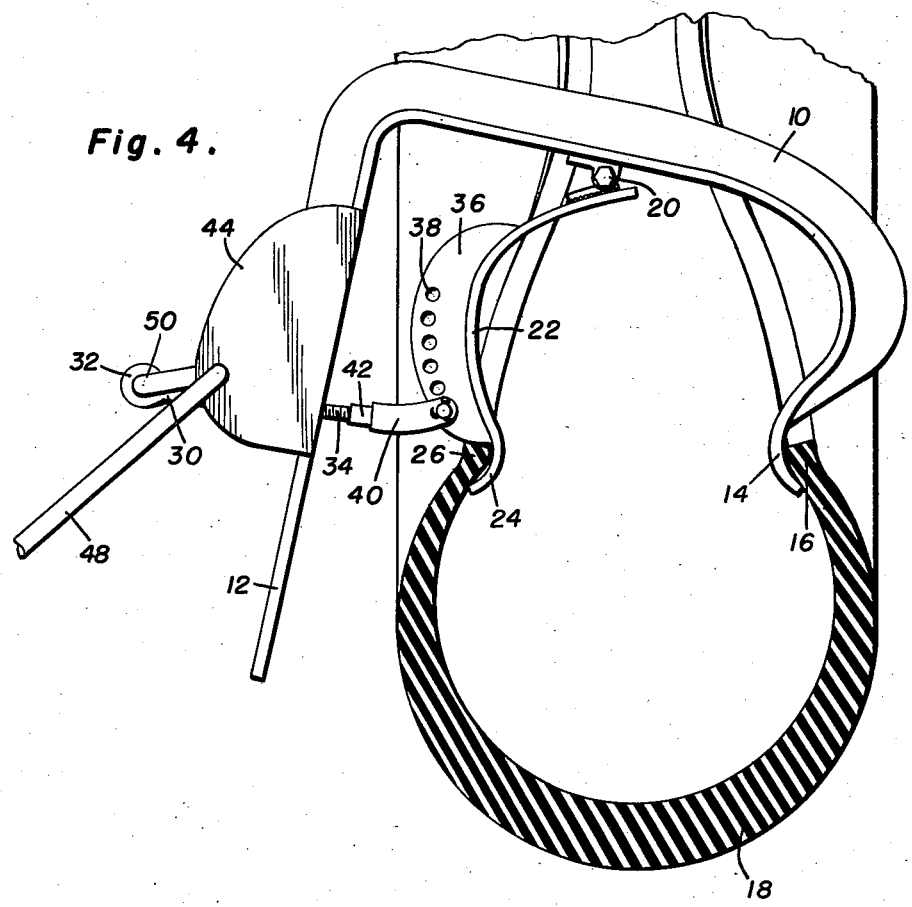
Figure 4 is a side elevational view showing the device in use.
Figure 5:
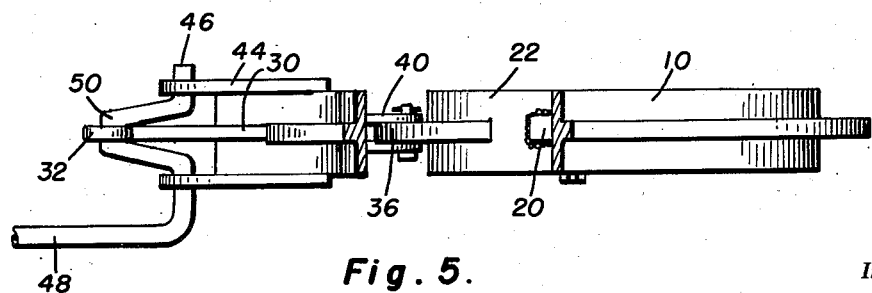
Figure 5 is a top plan view of Figure 1 with parts broken away and shown in section.

Referring now to the drawings in detail, wherein for the purpose of illustration, there is disclosed a preferred embodiment of the present invention the numeral 10 represents an inverted substantially U-shaped frame which is T-shaped in cross section. This frame terminates at one end in a handle 12, and the other end of said frame terminates in an outwardly curved fixed jaw 14, adapted to grip the inner periphery of one beading 16 of a tire 18 as shown in Figure 4.

Hingedly and removably secured as at 20 to the frame is an arcuate arm 22 having its lower end curved outwardly in an opposite direction to the jaw 14, to provide a movable jaw 24. The jaw 24 is adapted to grip the inner periphery of the adjacent beading 26 of the tire 18.

Extending loosely through a slot 28 in handle 12 is a connector rod 30 terminating in an eye 32 at one end and having screw threads 34 at the other end.

A fin 36 integrally formed with the arm 22 is provided with a plurality of apertures 38 which selectively and removably receive the bifurcated end 40 of an internally threaded sleeve 42. Said sleeve is receivably engaged by the threaded portion of the rod 30.

Figure 2:
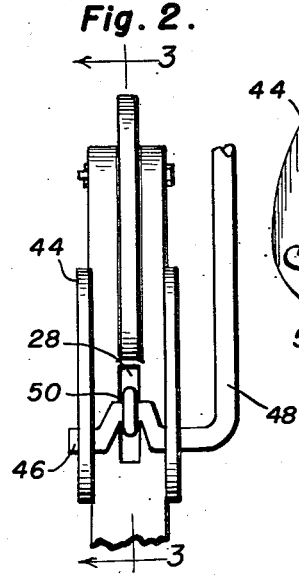
Figure 2 is a fragmentary end view of Figure 1.

Suitably secured to the side edges of the frame 10 and handle 12 are a pair of spaced parallel plates 44 in which is journaled one end 46 of an angular handle or lever 48. The end 46 is further provided with an outwardly extending crank portion 50 adapted for engagement by eye 32 of rod 30, as shown in Figure 2 of the drawings.

Figure 1:
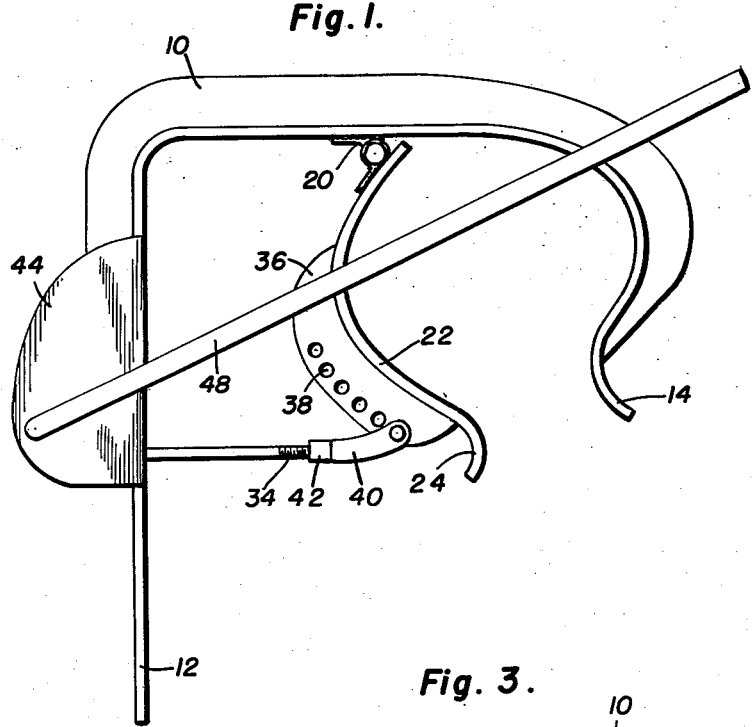
Figure 1 is a side elevational view of the improved tire tool.
Figure 3:
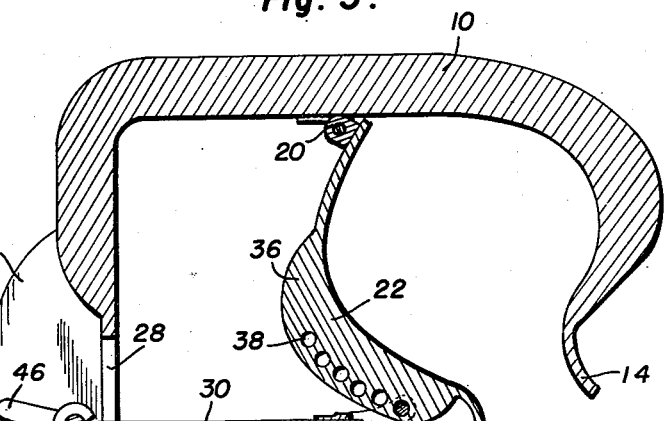
Figure 3 is a transverse sectional view taken on line 3—3 of Figure 2.

In use of the device the handle is first swung upwardly toward the jaw 14 so that the jaw 22 and jaw 14 are positioned toward each other, as shown in Figure 1 of the drawings. In this position the device may be inserted into a tire casing.

Holding the handle 12 with one hand and pulling forwardly and downwardly with the handle 48 with the other hand the jaws 14 and 24 are spread apart which also spreads the tire casing, as shown in Figure 4, for entrance into said tire casing.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what I claim as new is:

1. A tire tool comprising an inverted substantially U-shaped frame terminating at one end in a handle, a fixed jaw at the other end of said frame, a pivotal jaw pivoted to said frame for swinging movement relative to said fixed jaw, a transversely movable rod slidably carried by said frame, means adjustably connecting said rod to said pivotal jaw, plates carried by said frame and an angular handle journaled on said plates and detachably connected to said rod for actuation of said pivotal jaw, said handle having a crank portion engaging said rod and disposed between said plates.

2. The combination of claim 1, wherein said rod includes a terminal eye engaged with the crank portion of said lever.

3. The combination of claim 1, wherein said fixed jaw and said pivotal jaw include outwardly flared end portions.

4. The combination of claim 1, wherein said fixed jaw and said pivotal jaw are coplanar.

5. The combination of claim 1, wherein said means adjustably connecting said rod to said pivotal jaw includes a fin integrally formed with said pivotal jaw and having a plurality of spaced apertures, a sleeve carried by said rod and having a bifurcated terminal, and means carried by the bifurcated terminal of said sleeve and received in a selected one of said apertures.

6. A tire tool comprising a substantially U-shaped frame having a fixed jaw at one end and a handle at its other end, a movable jaw pivoted to said frame and between said handle and said fixed jaw for swinging movement toward and away from said fixed jaw, said handle having an aperture in registry with said movable jaw, a rod slidably received in said aperture and pivoted to said movable jaw, and a lever rotatably supported on said handle and having a crank portion rotatably supporting said rod to impart sliding movement of said rod during rotation of said lever.

JAMES HENRY SCHWARTZ.

REFERENCES CITED

The following references are of record in the file of this patent:

UNITED STATES PATENTS

| Number | Name | Date |
|---|---|---|
| 1,373,348 | Nation | Mar. 29, 1921 |
| 1,445,343 | Miller | Feb. 13, 1923 |
| 1,469,473 | Battaline | Oct. 2, 1923 |
| 1,869,244 | Gabler | July 26, 1932 |
| 1,902,283 | Jackson et al. | Mar. 21, 1933 |